(12) United States Patent
Chatterjee et al.

(10) Patent No.: US 10,185,639 B1
(45) Date of Patent: Jan. 22, 2019

(54) SYSTEMS AND METHODS FOR PERFORMING FAILOVER IN STORAGE SYSTEM WITH DUAL STORAGE CONTROLLERS

(71) Applicant: American Megatrends, Inc., Norcross, GA (US)

(72) Inventors: Paresh Chatterjee, Fremont, CA (US); Vijayarankan Muthirisavenugopal, Duluth, GA (US); Jomy Jose Maliakal, Duluth, GA (US); Sharon Samuel Enoch, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 242 days.

(21) Appl. No.: 15/143,882

(22) Filed: May 2, 2016

Related U.S. Application Data

(60) Provisional application No. 62/158,620, filed on May 8, 2015.

(51) Int. Cl.
*G06F 11/00* (2006.01)
*G06F 11/20* (2006.01)

(52) U.S. Cl.
CPC ...... *G06F 11/2092* (2013.01); *G06F 11/2023* (2013.01); *G06F 11/2033* (2013.01); *G06F 2201/805* (2013.01)

(58) Field of Classification Search
CPC ............. G06F 11/2092; G06F 11/2023; G06F 11/2025; G06F 11/2033; G06F 11/2046; G06F 11/2053; G06F 11/2069; G06F 11/2089; G06F 11/2094; G06F 11/2097; G06F 2201/805
See application file for complete search history.

(56) References Cited

U.S. PATENT DOCUMENTS

| | | |
|---|---|---|
| 4,942,579 A | 7/1990 | Goodlander et al. |
| 5,257,367 A | 10/1993 | Goodlander et al. |
| 5,680,538 A | 10/1997 | Jones et al. |
| 5,720,027 A | 2/1998 | Sarkozy et al. |
| 5,732,238 A | 3/1998 | Sarkozy |
| 5,790,774 A | 8/1998 | Sarkozy |

(Continued)

*Primary Examiner* — Bryce P Bonzo
*Assistant Examiner* — Anthony J Amoroso
(74) *Attorney, Agent, or Firm* — Meunier Carlin & Curfman LLC

(57) ABSTRACT

An example computer-implemented method for performing failover operations in a data storage system is described herein. The data storage system can include a first storage controller and a second storage controller for processing input/output ("I/O") operations for the data storage system. The method can include, in response to a failure of the first storage controller, performing failover operations with the second storage controller, and processing the I/O operations with the second storage controller. The failover operations can include preparing a disk subsystem layer for I/O operations, preparing a device manager layer for the I/O operations, and preparing a network layer for the I/O operations. The disk subsystem, device manager, and network layers can be prepared for the I/O operations without dependencies. In particular, preparation of the network layer is not dependent on preparation of the disk subsystem layer or the device manager layer.

17 Claims, 5 Drawing Sheets

(56) References Cited

U.S. PATENT DOCUMENTS

| | | | |
|---|---|---|---|
| 5,893,919 A | 4/1999 | Sarkozy et al. | |
| 6,098,128 A | 8/2000 | Velez-McCaskey et al. | |
| 6,151,659 A | 11/2000 | Solomon et al. | |
| 6,173,377 B1 | 1/2001 | Yanai et al. | |
| 6,490,659 B1* | 12/2002 | McKean | G06F 11/1441 711/141 |
| 6,523,032 B1 | 2/2003 | Sunkara et al. | |
| 6,578,158 B1* | 6/2003 | Deitz | G06F 11/2092 714/11 |
| 6,671,705 B1 | 12/2003 | Duprey et al. | |
| 6,681,339 B2* | 1/2004 | McKean | G06F 11/2092 714/5.11 |
| 6,757,774 B1 | 6/2004 | Benson et al. | |
| 6,915,448 B2 | 7/2005 | Murphy et al. | |
| 7,143,308 B2 | 11/2006 | Tseng et al. | |
| 7,308,601 B2 | 12/2007 | Ikeuchi et al. | |
| 7,406,621 B2 | 7/2008 | Lubbers et al. | |
| 7,412,563 B2 | 8/2008 | Subbarao et al. | |
| 7,536,586 B2 | 5/2009 | Ahmadian et al. | |
| 7,596,712 B1 | 9/2009 | Gole et al. | |
| 7,689,675 B2 | 3/2010 | Tucker | |
| 7,694,171 B2 | 4/2010 | Manoj | |
| 7,779,294 B2 | 8/2010 | Corrado et al. | |
| 7,808,889 B1* | 10/2010 | Howard | G06F 11/1658 370/217 |
| 7,908,448 B1 | 3/2011 | Chatterjee et al. | |
| 7,975,168 B2 | 7/2011 | Morita et al. | |
| 8,046,548 B1 | 10/2011 | Chatterjee et al. | |
| 8,090,980 B2 | 1/2012 | Danilak | |
| 8,255,739 B1 | 8/2012 | Chatterjee et al. | |
| 8,464,090 B2 | 6/2013 | Nagpal et al. | |
| 8,650,328 B1 | 2/2014 | Chatterjee et al. | |
| 8,667,322 B1 | 3/2014 | Chatterjee et al. | |
| 2002/0112023 A1 | 8/2002 | Karamanolis et al. | |
| 2002/0124139 A1 | 9/2002 | Baek et al. | |
| 2003/0041283 A1 | 2/2003 | Murphy et al. | |
| 2003/0056049 A1 | 3/2003 | Kaku | |
| 2003/0097607 A1 | 5/2003 | Bessire | |
| 2003/0115412 A1 | 6/2003 | Franklin et al. | |
| 2004/0148460 A1 | 7/2004 | Steinmetz et al. | |
| 2005/0050381 A1 | 3/2005 | Maddock | |
| 2005/0166083 A1 | 7/2005 | Frey et al. | |
| 2005/0228942 A1 | 10/2005 | Nichols et al. | |
| 2005/0234934 A1 | 10/2005 | Mackay et al. | |
| 2005/0278476 A1 | 12/2005 | Teske et al. | |
| 2006/0236064 A1 | 10/2006 | Niles et al. | |
| 2006/0242540 A1 | 10/2006 | Cherian et al. | |
| 2007/0079105 A1 | 4/2007 | Thompson | |
| 2007/0174657 A1 | 7/2007 | Ahmadian et al. | |
| 2008/0005612 A1 | 1/2008 | Arai | |
| 2008/0028107 A1 | 1/2008 | Cherian et al. | |
| 2008/0126840 A1 | 5/2008 | Chen et al. | |
| 2008/0201616 A1 | 8/2008 | Ashmore | |
| 2008/0270704 A1 | 10/2008 | He et al. | |
| 2009/0044043 A1 | 2/2009 | Cherian et al. | |
| 2012/0265910 A1* | 10/2012 | Galles | G06F 13/4022 710/300 |

* cited by examiner

SYSTEMS AND METHODS FOR PERFORMING FAILOVER IN STORAGE SYSTEM WITH DUAL STORAGE CONTROLLERS

CROSS-REFERENCE TO RELATED APPLICATIONS

This application claims the benefit of U.S. Provisional Patent Application No. 62/158,620, filed on May 8, 2015, entitled "SYSTEMS AND METHODS FOR PERFORMING FAILOVER IN STORAGE SYSTEM WITH DUAL STORAGE CONTROLLERS," the disclosure of which is expressly incorporated herein by reference in its entirety.

BACKGROUND

In a computer-driven business world where any down time can result in lost profits and even loss of the business itself, data availability has become a primary motivation in designing fault-tolerant storage servers with every component protected against failure using redundancy. This includes building storage servers not just with dual cores, redundant array of inexpensive disks ("RAID"), redundant power supplies, redundant network and other ports, but also with dual controllers (i.e., dual redundant controllers). This implies dual, redundant memory and processor resources. Initiatives such as the storage bridge bay ("SBB") specification with dual/multiple canisters, each housing a controller, within a single chassis have accelerated the move towards these architectures. A widely-held, but difficult-to-achieve, standard of availability for a system or product is known as "five 9s" (i.e., 99.999 percent) availability.

Even though it is difficult to achieve the "five 9s" availability in storage servers, "five 9s" availability can be nearly achieved using active-passive or active-active dual redundant controllers with minimal failover time. Upon failure of any component in one controller (e.g., a primary controller), the other controller (e.g., the secondary controller) is designed to take over the input/output ("I/O") operations without interruption. The failover mechanism is designed to be very efficient and less time consuming. To achieve this goal, all of the underlying hardware devices and software modules (or layers) are designed to be ready and perform seamlessly without too much delay. Additionally, on failover, the secondary controller must be able to recover data and/or metadata quickly without any loss or corruption.

Conventional failover operations involve various steps that are performed one after the other (i.e., sequentially). These steps include making the disk subsystem or RAID subsystem ready for the secondary controller, mounting the block devices or file system, exposing the block devices or file system to the end user application, and ensuring the network connectivity to the storage device is fully functional. There are dependencies between the various layers (or modules) in the storage server software stack executing the steps above. It should be understood that the failover time can be quite lengthy depending upon the number of disks, number of block devices, number of network ports, etc. Additionally, if all of the layers in the storage server software stack are not ready within configured timeout periods, the I/O operations will fail from the client application. Efficient, dependable, and highly-available storage servers are designed in consideration of the dependencies between layers of the storage server software stack such that data availability from the client is not disrupted at any cost, without increasing the timeout values.

SUMMARY

An example computer-implemented method for performing failover operations in a data storage system is described herein. The data storage system can include a first storage controller and a second storage controller (e.g., dual redundant storage controllers) for processing I/O operations for the data storage system. The method can include, in response to a failure of the first storage controller, performing failover operations with the second storage controller, and processing the I/O operations with the second storage controller. The failover operations can include preparing a disk subsystem layer for I/O operations, preparing a device manager layer for the I/O operations, and preparing a network layer for the I/O operations. The disk subsystem, device manager, and network layers can be prepared for the I/O operations without dependencies. In particular, preparation of the network layer is not dependent on preparation of the disk subsystem layer or the device manager layer.

Optionally, preparation of the network layer for the I/O operations begins before completing preparation of the disk subsystem layer or the device manager layer for the I/O operations. Alternatively or additionally, the network layer is optionally prepared for the I/O operations in parallel with preparing the disk subsystem and device manager layers for the I/O operations.

Alternatively or additionally, the method can optionally include creating one or more pseudo devices for fielding the I/O operations. The second storage controller can present the pseudo devices (e.g., volumes, block devices or file system) to initiators of the I/O operations. Additionally, the method can optionally include synchronizing data between the first and second storage controllers before the failure of the first storage controller. Synchronizing data between the first and second storage controllers maintains the fidelity or accuracy of write I/O operation order. The one or more pseudo devices can be created using the synchronized data. For example, the synchronized data can include volume data, volume metadata, cache data, and/or cache metadata.

Alternatively or additionally, the method can optionally include receiving an I/O operation directed to the one or more pseudo devices, and maintaining the received I/O operation in a queue. The received I/O operation can be processed by the second storage controller from the queue after the data subsystem layer, device manager layer, and network layer are prepared for the I/O operations.

Optionally, a block device or file system can be mounted while preparing the device manager layer for the I/O operations. Alternatively or additionally, organization of a RAID can be abstracted while preparing the disk subsystem layer for the I/O operations.

It should be understood that the above-described subject matter may also be implemented as a computer-controlled apparatus, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for performing failover operations in a data storage system where the physical storage is organized as a RAID, it will become evident to those skilled in the art that the implementations are not limited thereto.

The following detailed description is directed to technologies for performing failover operations in a storage system (also referred to herein as a data storage system) having redundant storage controllers. While the subject matter described herein is presented in the general context of program modules that execute on one or more storage controllers in a storage system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, microprocessor-based or programmable consumer electronics, minicomputers, mainframe computers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Figure 1:
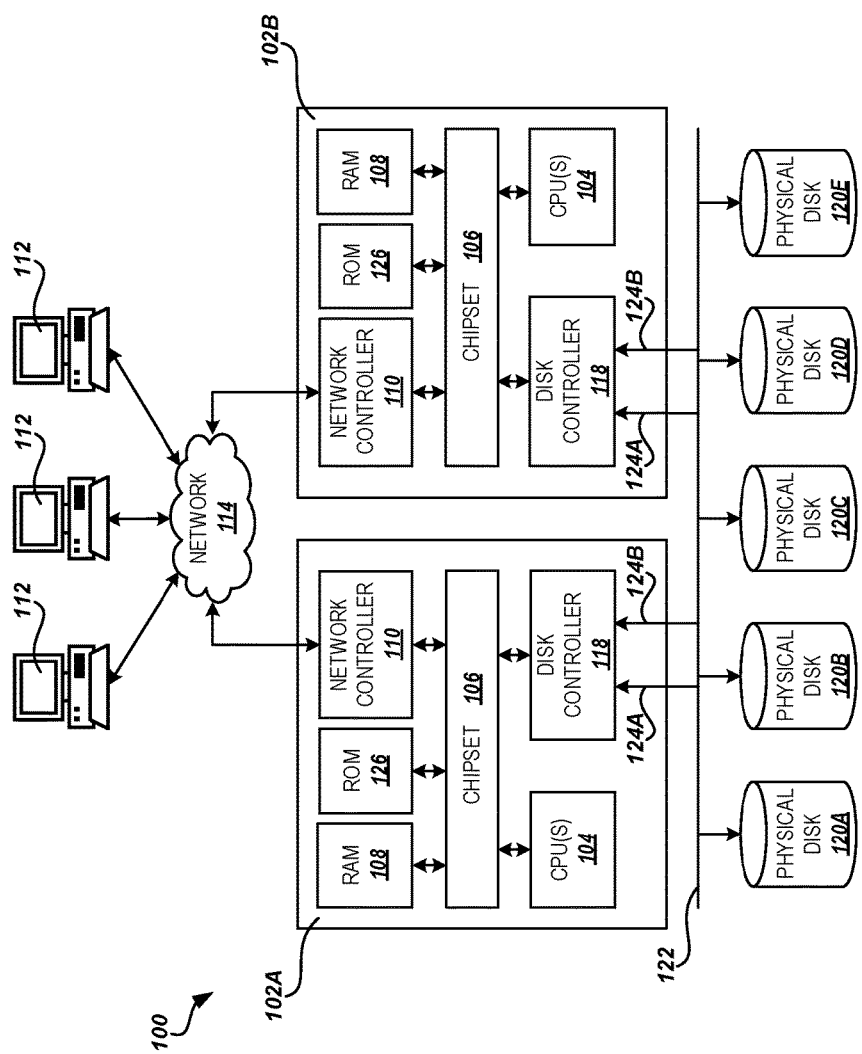
FIG. 1 is a computer architecture diagram illustrating a computer hardware architecture for a storage system including redundant storage controllers, according to embodiments presented herein.

FIG. 1 and the following discussion are intended to provide a brief, general description of a suitable computing environment in which the embodiments described herein may be implemented. In particular, FIG. 1 shows an exemplary storage system 100 including two storage computers, or storage controllers 102A, 102B (also referred to herein as storage controller 102). Storage controllers 102A, 102B are also referred to herein as first and second storage controllers, as well as primary and secondary controllers. Each storage controller 102 includes a baseboard, or "motherboard," which is a printed circuit board to which a multitude of components or devices may be connected by way of a system bus or other electrical communication paths. In one illustrative embodiment, one or more central processing units ("CPUs") 104 operate in conjunction with a chipset 106. The CPUs 104 are standard programmable processors that perform arithmetic and logical operations necessary for the operation of the storage controller 102.

The CPUs 104 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 106 provides an interface between the CPUs 104 and the remainder of the storage controller 102. The chipset 106 also provides an interface to a random access memory ("RAM") 108 used as the main memory in the storage controller 102. The chipset 106 also includes functionality for providing network connectivity through a network controller 110, such as a gigabit Ethernet adapter. The network controller 110 is capable of connecting the storage controllers 102A, 102B to each other as well as to other client computers 112 (or initiators) acting as initiators of I/O operations over a network 114. The network 114 may be an Ethernet or Gigabyte Ethernet LAN, a fiber ring, a fiber star, wireless, optical, satellite, a WAN, a MAN, or any other network technology, topology, protocol, or combination thereof.

According to embodiments, each storage controller 102A, 102B is connected to a number of physical storage devices, such as physical disks 120A-120E (also referred to herein as physical disks 120) shown in FIG. 1. The physical disks 120 provide the data storage capacity required for the storage controller 102 to store data and service I/O operations initiated by the client computers 112 over the network 114. A disk controller 118 allows the storage controller 102 to communicate with the physical disks 120 connected to the storage controller. According to one embodiment, the disk controller 118 may interface with the physical disks 120 through a serial attached SCSI ("SAS") interface. In other embodiments, the disk controller 118 may interface with the physical disks 120 utilizing a serial advanced technology attachment ("SATA") interface, a fiber channel ("FC") interface, or other standard interface for physically connecting and transferring data between computers and physical storage devices.

According to embodiments, the physical disks 120 may be connected to the storage controller 102 through a bus 122 that allows the disk controller 118 to communicate with the disks. In one embodiment, the physical and electrical structure of the bus 122 may be based upon the SBB specification. The SBB specification defines mechanical, electrical, and low-level enclosure management requirements for a single enclosure that supports the connection of multiple storage controllers 102 as well as multiple physical disks 120 from a variety of hardware and system vendors. The SBB mid-plane provides the bus 122 that allows multiple storage controllers 102A, 102B to be connected to and communicate with the physical disks 120 concurrently.

In addition, the SBB mid-plane bus 122 provides facilitates for the storage controllers 102A, 102B to communicate with each other via the SAS, SATA, or FC interface implemented on the bus. According to embodiments, the disk controller 118 is capable of utilizing multiple point-to-point communication channels, or ports 124A, 124B, to communicate with other devices over the SBB bus 122. For example, the disk controller 118 may utilize one or more ports 124A to communicate with each physical disk 120 across the bus 122, while utilizing a separate port 124B to communicate across the bus with the other storage controller 102. Inter-controller communication techniques for use by redundant storage controllers are known in the art. For example, one example inter-controller communication technique is described in U.S. Pat. No. 8,650,328 to Chatterjee et al., entitled "BI-DIRECTIONAL COMMUNICATION BETWEEN REDUNDANT STORAGE CONTROLLERS". This disclosure contemplates that any known inter-controller communication technique may be used by the redundant storage controllers.

The storage controller 102 may store data on the physical disks 120 by transforming the physical state of the disks to reflect the information being stored. The specific transformation of physical state may depend on various factors, in different implementations of this description. Examples of such factors may include, but are not limited to, the technology used to implement the physical disks 120, whether the physical disks are characterized as primary or secondary storage, and the like. For example, the storage controller 102 may store data to the physical disks 120 by issuing instructions to the disk controller 118 to alter the magnetic characteristics of particular locations within the physical disk drives. These transformations may also include altering the physical features or characteristics of other media types, including altering the reflective or refractive characteristics of a particular location in an optical storage device, or modifying the electrical characteristics of a particular capacitor, transistor, or other discrete component in a solid-state storage device. Other transformations of physical media are possible without departing from the scope and spirit of the present description, with the foregoing examples provided only to facilitate this discussion. The storage controller 102 may further read information from the physical disks 120 by detecting the physical states or characteristics of one or more particular locations within the devices.

In addition to the physical disks 120 described above, the storage controller 102 may have access to other computer-readable storage medium to store and retrieve information, such as program modules, data structures, or other data. It should be appreciated by those skilled in the art that computer-readable storage media can be any available media that can be accessed by the storage controller 102. By way of example, and not limitation, computer-readable storage media may include volatile and non-volatile, removable and non-removable media implemented in any method or technology. Computer-readable storage media includes, but is not limited to, RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the storage controller 102.

The computer-readable storage media may store an operating system (not shown) utilized to control the operation of the storage controller 102. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The computer-readable storage media may store other system or application programs and data utilized by the storage controller 102. In one embodiment, the computer-readable storage medium may be encoded with computer-executable instructions that, when loaded into the storage controller 102, may transform the computer system from a general-purpose computing system into special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the storage controller 102 by specifying how the CPUs 104 transitions between states, as described above. According to one embodiment, the storage controller 102 may have access to computer-readable storage media storing computer-executable instructions that, when executed by the computer system, perform the routines for performing failover operations in a storage system, described below in regard to FIG. 5.

The chipset 106 may also provide an interface to a computer-readable storage medium such as a ROM 126 or NVRAM for storing a firmware that includes program code containing the basic routines that help to startup the storage controller 102 and to transfer information between elements within the storage controller. The ROM 124 or NVRAM may also store other software components necessary for the operation of the storage controller 102 in accordance with the embodiments described herein. It will be appreciated that the storage controller 102 may not include all of the components shown in FIG. 1, may include other components that are not explicitly shown in FIG. 1, or may utilize an architecture completely different than that shown in FIG. 1.

Figure 2:
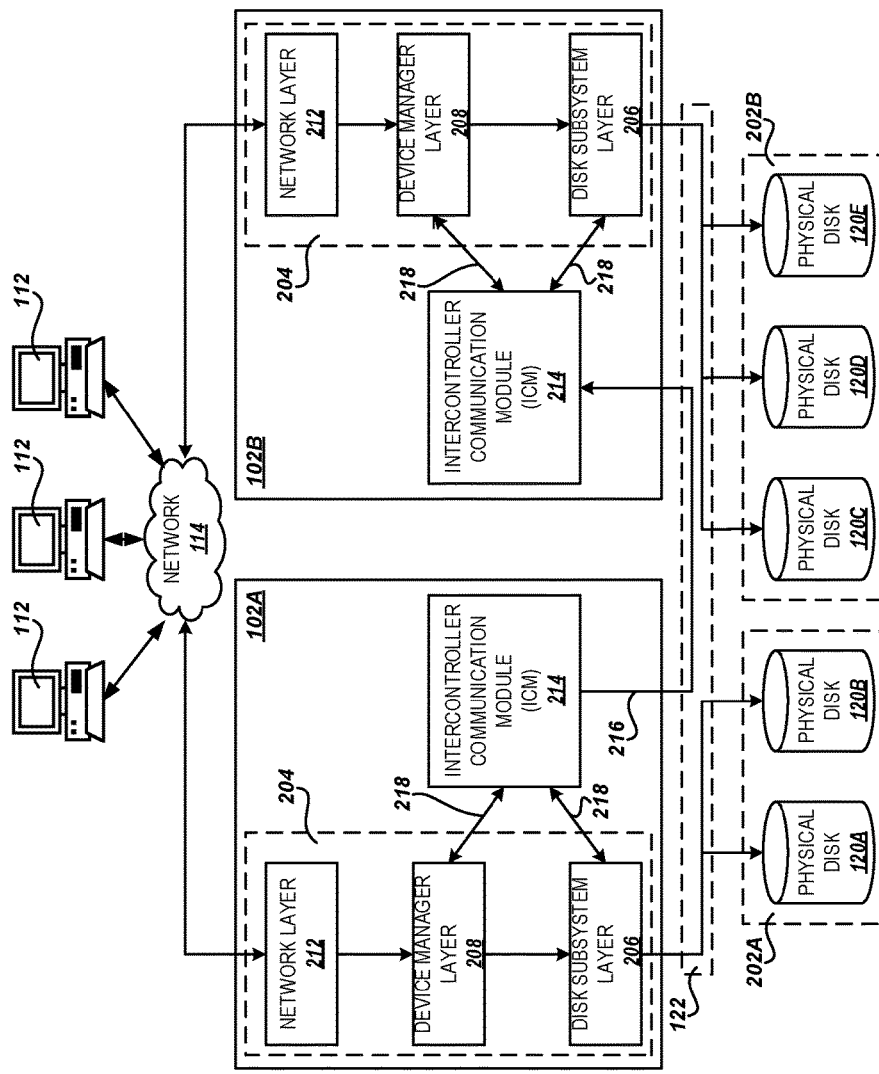
FIG. 2 is a block diagram showing aspects of the redundant storage controllers and the associated logical storage groups, including several software components provided by the embodiments presented herein.

FIG. 2 shows further aspects of the storage controllers 102, including software components and interfaces utilized by the embodiments described herein. According to embodiments, the storage controllers 102A and 102B may be configured in an active-active configuration, such that each storage controller actively processes read and write I/O operations initiated by the client computers 112. In this configuration, the physical disks 120A-120E connected to the bus 122 may be logically divided into storage groups 202A, 202B (also referred to herein generally as storage group 202). Each storage controller 102A, 102B may process I/O operations targeted to one of the logical storage groups 202A, 202B. For example, storage controller 102A may process I/O operations against physical disks 120A and 120B belonging to storage group 202A, while storage controller 102B processes I/O operations against physical disks 120C-120E belonging to storage group 202B. This disclosure also contemplates that the storage controllers 102A and 102B may be configured in an active-passive configuration, such that one controller actively processes read and write I/O operations initiated by the client computers 112 while the other controller serves as the spare or backup.

In one example implementation, the physical disks 120 in each of the logical storage groups 202A, 202B may be organized into a redundant array of inexpensive disks ("RAID"), such as a RAID 5 array. It will be appreciated, however, that the embodiments described herein may be utilized with storage controllers 102 connected to storage groups 202A, 202B organized at other standard RAID levels, and that the RAID level in each of the storage groups need not be the same. It will be further appreciated that the physical disks 120 within each of the logical storage groups 202A, 202B may be configured in other configurations beyond the RAID configurations described herein.

The storage controller 102 implements a storage stack 204 which contains storage modules (or layers) and interfaces allowing the storage controller to process I/O operations initiated from the client computers 112 against the physical disks 120 in the associated logical storage group 202. The storage controller 102 accesses the physical disks 120 through a disk subsystem layer 206. The disk subsystem layer 206 abstracts the organization of the physical disks 120 in the storage group 202 and presents a logical block-level interface to higher layers in the storage stack 204. When the physical disks 120 are organized in a RAID configuration, the disk subsystem layer 206 can be a RAID layer, i.e., the layer that abstracts organization of the RAID and presents the logical block-level interface to higher layers such as a device manager layer 208 described below. The disk subsystem layer 206 may be implemented on the storage controller 102 in software, hardware, or a combination thereof. In one embodiment, the disk subsystem layer 206 is provided by the MD kernel extension provided by the LINUX operating system. In another embodiment, the disk subsystem layer 206 may be provided by a MEGARAID® storage adapter from LSI Corporation of Milpitas, Calif., installed in the storage controller 102. It will be appreciated that the disk subsystem layer 206 may be implemented by software and/or hardware components from a variety of vendors beyond those described herein.

A device manager layer 208 utilizes the block-level interface provided by the disk subsystem layer 206 to manage the storage provided by the storage group 202 and service I/O operations initiated by the client computers 112 across the network 114. The device manager layer 208 may be implemented on the storage controller 102 in software, hardware, or a combination thereof. The device manager layer 208 may implement a variety of storage management functions, such as volume virtualization, thin provisioning, snapshots, locking, data replication, etc.

Volume virtualization provides the facility to create and manage multiple, logical volumes in the storage group 202, as well as expand a logical volume across multiple storage devices within a storage cluster. Thin provisioning provides for the allocation of physical capacity of the storage group 202 to logical volumes on an as-needed basis. Snapshots provide functionality for creating and utilizing point-in-time snapshots of the contents of logical storage volumes. The locking functionality allows for synchronizing I/O operations within the storage controller 102 or across devices within the storage cluster. Data replication provides functionality for replicating data within the storage controller 102 or across storage devices within a storage cluster.

Optionally, a cache layer may be implemented above the device manager layer 208 in the storage stack 204. The cache layer caches data and metadata regarding active read and write I/O operations initiated against the storage group 202. The cache layer may be implemented on the storage controller 102 in software, hardware, or a combination thereof. In one embodiment, the cache layer may be the LINUX cache provided by the LINUX operating system.

A network layer 212 may also be provided by the storage stack 204. The network layer allows the client computers 112 to access the data stored in the storage group 202 across the network 114. For example, the storage stack 204 may implement a storage area network ("SAN") path that utilizes an internet small computer systems interface ("iSCSI") driver at the network layer 212. A network attached storage ("NAS") path may also be provided that utilizes the XFS high-performance journaling file system at the network layer 212. The storage controller 102 may expose logical storage volumes through a block-level interface via the SAN path, while exposing fileshares through a file-level interface via the NAS path. The network layer 212 may be implemented on the storage controller 102 in software, hardware, or a combination thereof. This disclosure contemplates that the storage stack 204 can have more or less layers than as described above, which are provided only as examples.

According to embodiments, redundancy is provided in the active-active configuration of the storage system by having each of the storage controllers 102A, 102B operate as both the primary controller for its associated storage group 202A, 202B and a secondary controller or "hot spare" for the other storage controller. For example, as seen in FIG. 2, storage controller 102A may act as the primary controller for storage group 202A while also acting as a hot spare for storage controller 102B and storage group 202B. Similarly, storage controller 102B may act as the primary controller for storage group 202B while also acting as a hot spare for storage controller 102A and storage group 202A. If a primary storage controller 102 fails, the hot spare controller can take over servicing I/O operations for the associated storage group 202. Technologies such IP virtualization or multipath I/O ("MPIO") may be implemented by the storage stack 204 to make such controller-failovers transparent to the client computers 112 initiating I/O operations.

In order for each storage controller 102 to function as a secondary controller or hot spare for the other, the various storage modules in the storage stack 204 of the primary controller may be required to communicate data and metadata regarding active I/O operations to their counterparts in the secondary controller. This data and/or metadata can be exchanged between the primary and secondary controllers before failure of the primary controller (e.g., while the primary controller is the active controller and the secondary controller is the hot-spare controller). Synchronizing data between the first and second storage controllers maintains the fidelity or accuracy of write I/O operation order. Examples of data and/or metadata to be exchanged are provided below. It should be understood that this disclosure is not limited to these examples and the data and/or metadata can be any data regarding active I/O operations. For example, the device manager layer 208 on the primary controller 102A can optionally keep allocation tables and other metadata regarding logical volumes residing on the storage group 202A current on the secondary controller 102B. Or, the disk subsystem layer 206 on the primary controller 102A can optionally maintain a table of outstanding writes on the secondary controller 102B in order for the controller to be able to perform a consistency check if the case of a failure of the primary controller and recovery by the secondary controller. Further, the cache layer on the primary controller 102A for the storage group 202A can optionally periodically synchronize active cached items with the cache layer on the secondary controller 102B.

It will be appreciated that, because each storage controller 102 is acting as both the primary controller for the associated storage group 202 as well as the secondary controller for the opposite storage group, the communication between storage modules and the storage controllers must be bi-directional. In other words, the modules on the primary controller 102A for storage group 202A must be able to write data and metadata to the modules of its secondary controller 102B, and the modules on the primary controller 102B for storage group 202B must be able to write data and metadata to the modules of its secondary controller 102A.

The communication of data and metadata between the storage modules of the separate storage controllers 102 may be facilitated by an inter-controller communication module ("ICM") 214 executing on each storage controller 102. The ICM 214 may be implemented on the storage controller 102 in software, hardware, or a combination thereof. In one embodiment, the ICM 214 on each storage controller 102 communicates with the corresponding controller through the disk controller 118 via a port 124B provided by the bus 122 connecting the storage controllers. As described above regarding FIG. 1, the bus port 124B may provide a point-to-point communication channel 216 between the storage controllers 102 utilizing the SAS, SATA, or FC interface implemented on the bus 122. Additionally, the ICM 214 can provide an application programming interface ("API") 218 for communicating with the counterpart layers or modules.

Utilizing the bus port 124B for inter-controller communications may provide benefits over other connections that may exist between the storage controllers 102, such as the network 114. For example the bus port 124B may provide greater bandwidth (12 GB for a SAS port) compared to typical network connection (1 GB for an Ethernet connection). In addition, the software stack for communicating over the bus port 124B is already implemented via the disk controller 118 and may be smaller and more efficient than a typical TCP/IP stack utilized to communicate across the network 114.

The SAS, SATA, or FC interface implemented on the bus 122 may not provide for bi-directional communication through the bus port 124B, and may require that a storage controller 102 operate in either an "initiator" role or a "target" role while communicating over the bus 122. For example, in the SAS protocol, a SAS initiator may execute SCSI commands against a SAS target, but the target is not able to initiate commands against the initiator. While some implementations of the bus 122 may allow the storage controller 102 to operate in both roles simultaneously, the hardware used in these "dual role" implementations may be more complex and may not provide as stable an environment as the traditional and more widely used single-mode hardware. Additionally, U.S. Pat. No. 8,650,328 to Chatterjee et al., entitled "BI-DIRECTIONAL COMMUNICATION BETWEEN REDUNDANT STORAGE CONTROLLERS" describes one example technique for implementing bi-directional communication between the primary and secondary controllers, which can be used to exchange the data and/or metadata described above. In U.S. Pat. No. 8,650,038, the ICM 214 on one of the storage controllers 102A operates in the initiator role, while the ICM on the other storage controller 102B operates in the target role while performing inter-controller communication over the point-to-point communication channel 216 through the bus port 124B. This disclosure contemplates that any known inter-controller communication technique may be used by the primary and secondary controllers to exchange the data and/or metadata described above.

Although an application may not retry a failed or timed out command, the block subsystem of an initiator (e.g., the client computers 112 of FIGS. 1 and 2) may retry a command after a configured timeout period has expired. In addition, the various layers (or modules) of a storage server stack (e.g., the storage stack 204 of FIG. 2) may also have respective timeout periods. As a general rule, the component at the lowest level of the storage server stack (e.g., the disk subsystem layer 206 of FIG. 2) has the minimum timeout period (e.g., the timeout period with shortest duration) such that higher layers (e.g., the device manager layer 208 and the network layer 212 of FIG. 2) do not time out prematurely. The overall timeout period for the failover operations (e.g., the sum of the timeout periods for each of the respective layers of the storage server stack) can be set to not exceed the I/O operation timeout configured on the application side. In addition, a moderate to substantial timeout period is typically assigned for the disk subsystem layer(s) in conventional data storage systems. For example, this timeout period can typically be from forty seconds to one minute. It should be understood that the timeout period between forty seconds and one minute for the disk subsystem layer(s) is provided only as an example and that the timeout period can be another value (e.g., more or less than between forty seconds and one minute).

In a non-highly-available configuration, the disk subsystem layer may have a timeout period closer to one minute, which necessitates that the respective timeout values of the higher layers in the storage server stack, as well as the respective timeout periods of the initiators, to be set to a higher value (e.g., greater than one minute). If not, it is possible that commands issued by the initiators may fail even though the disk subsystem layer could recover given additional time. Additionally, in a highly-available configuration (e.g., a clustered storage server environment), the considerations are somewhat different. For example, according to the SBB specification such as that of STORTRENDS 3400, 3500, and 3600 of AMERICAN MEGATRENDS, INC. of Norcross, Ga., after the primary controller (e.g., the storage controller 102A of FIG. 2) fails (or times out), the secondary controller (e.g., the storage controller 102B of FIG. 2) has to prepare for providing services during failover. Therefore, the time needed to prepare or bring up the various layers of the storage server stack of the secondary controller must be added to the overall timeout period. This may require setting a timeout period having a longer duration for the initiators, which may not allow the initiators to work properly and/or may at least be unacceptable to end users. Therefore, for clustered storage server environments, one approach is to set the timeout period for the disk subsystem layer of the controller to have a shorter duration than the timeout period for the disk subsystem layer of a typical controller in a non-clustered storage server environment. After the primary controller times out, the secondary controller begins failover operations and starts up. Because of the redundancy provided by the primary and secondary controllers, availability is not adversely impacted, and, at the same time, excessive timeout periods for the initiators need not be set.

In addition, operations of a network layer (e.g., the network layer 212 of FIG. 2) of the storage server stack should be considered. As part of the failover operations, the network layer of the secondary controller takes over the network credentials and impersonates its network identity.

For example, when an I/O operation from one path to the primary controller (i.e., the failed controller) times out, the initiator resends the I/O operation from a different path to the secondary controller (i.e., the failover controller) after the initiator's timeout expires. When the I/O operation is fielded by the secondary controller, the I/O operation can optionally not be immediately failed and instead can optionally be held for a longer time. It should be understood that the I/O operation also goes through a timeout consideration on the initiator side. However, a problem arises if the network layer of the secondary controller is not ready soon enough to receive the I/O operation because the I/O operation may fail.

Figure 3:
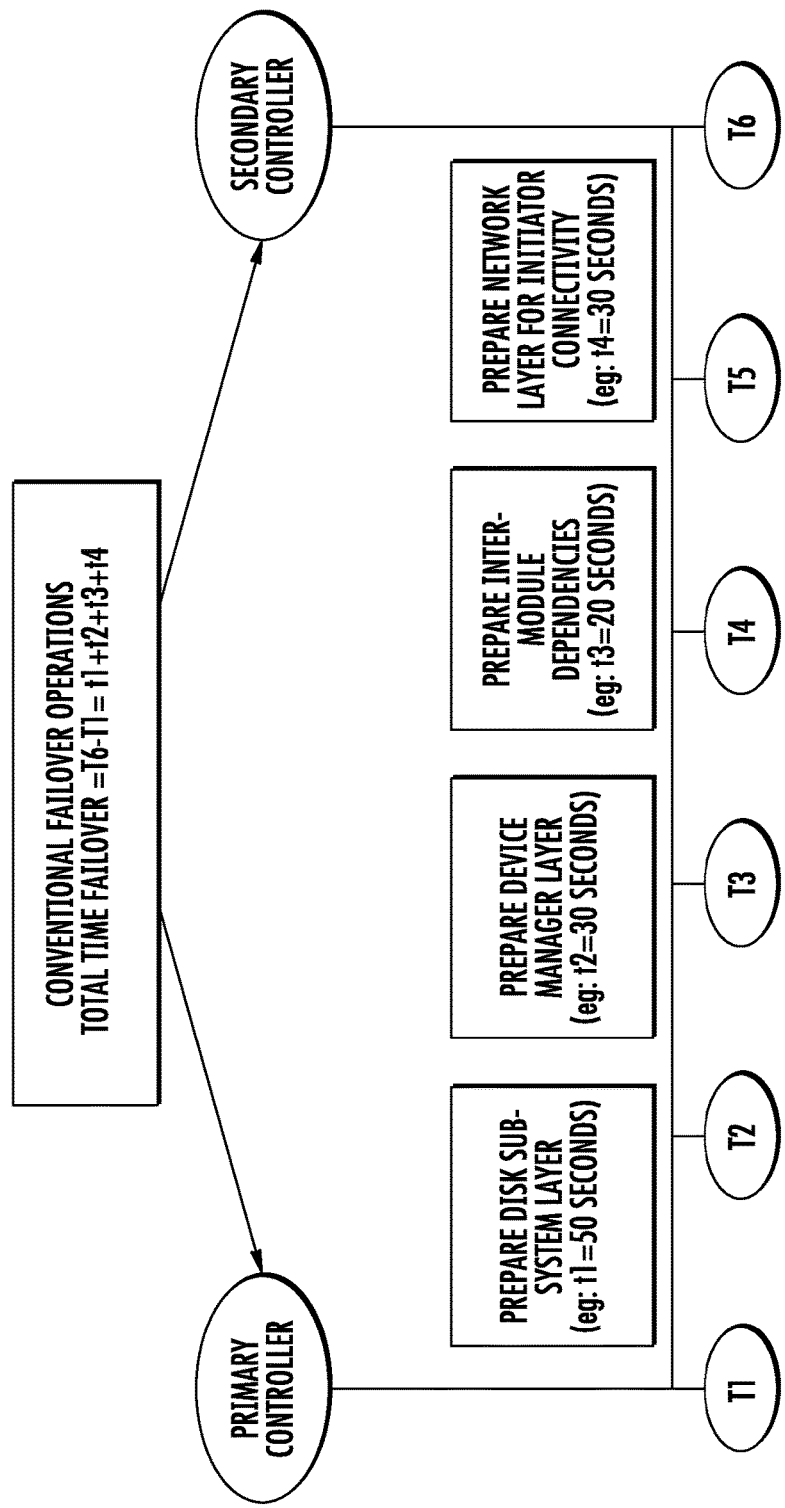
FIG. 3 is a diagram illustrating conventional failover operations in a storage system with redundant storage controllers.

In summary, conventional failover operations might include one or more of the following steps. For example, FIG. 3 is a diagram illustrating conventional failover operations. The conventional steps are performed in sequence. In other words, according to conventional failover operations, each subsequent step is dependent on a prior step such that performance of the subsequent step requires completion of the prior step. In FIG. 3, the primary controller fails at time T1. In a first step, the lowest layer of the storage server stack (e.g., the disk subsystem layer) of the secondary controller (i.e., the failover controller) is prepared for I/O operations. In FIG. 3, preparing the disk subsystem layer may take approximately 50 seconds (e.g., t1=50 seconds). This step can optionally include abstracting organization of a RAID. Upon completion of preparing the disk subsystem layer, the next highest layer of the storage server stack (e.g., the device manager layer) of the secondary controller is prepared for the I/O operations. In FIG. 3, preparing the device manager layer may take approximately 30 seconds (e.g., t2=30 seconds). This step can optionally include mounting a block device or file system. Target devices for the I/O operations can then be enabled and exposed to the initiators of the I/O operations. As described above, logical storage volumes can be exposed through a block-level interface via a SAN path and/or fileshares can be exposed through a file-level interface via a NAS path. Upon completion preparing the device manager layer, the software stack (e.g., the storage stack 204 of FIG. 2) inter-module dependencies are prepared. In FIG. 3, preparing the inter-module dependencies may take approximately 20 seconds (e.g., t3=20 seconds). Upon completion of preparing the inter-module dependencies, the next highest layer of the storage server stack (e.g., the network layer) of the secondary controller is prepared for the I/O operations. In FIG. 3, preparing the network layer may take approximately 30 seconds (e.g., t4=30 seconds). This step can optionally include taking over the network credentials and impersonating its network identity. In FIG. 3, the secondary controller (i.e., the failover controller) is ready to take over I/O operations at time T6. Accordingly, the total failover time in FIG. 3 is T6−T1=t1+t2+t3+t4=130 seconds. It should be understood that the respective times for preparing the various layers as described with reference to FIG. 3 are provided only as examples and that the respective times may have other values. For example, the estimated times for preparing the various layers described above with regard to FIG. 3 depend on various factors in the storage server stack including, but not limited to, RAID level, a number of RAID devices, the number of modules in the storage server stack which has inter-module dependencies, and the number of network devices. As described above, the overall timeout period for the failover operations can be set to not exceed the I/O operation timeout configured on the application side.

As described with reference to FIG. 3, each of the various layers (e.g., the disk subsystem, device manager, and network layers) takes a fixed amount of time to start up, all of which add to the total failover time. Further, as described above, each subsequent layer in the storage server stack is dependent on startup of the prior layers in the storage server stack. For example, according to conventional failover operations, preparing the network layer without having any device (e.g., storage volumes, fileshares, etc.) in the storage server stack to serve the I/O operations will result in failure of the I/O operations to the client applications. In order to prepare the devices, data and/or metadata (e.g., volume data, volume metadata, cache data, cache metadata, etc.) must be updated in the secondary controller (i.e., the failover controller). If this information is persisted only in the disk subsystem, then the secondary controller must wait for the disk subsystem layer to be ready. Thereafter, the device manager layer must start up so that the devices (e.g., storage volumes, fileshares, etc.) can be mounted. Once the device manager layer is ready, the devices can be exposed to the end users by enabling the targets. After completing preparation of the disk subsystem and device manager layers and updating the data and/or metadata in the secondary controller, the network layer can finally start up because at this point the devices in the storage server stack are ready to serve the I/O operations.

Accordingly, alternative techniques for performing failover operations in a data storage system with redundant storage controllers are described herein. These techniques can optionally reduce the total failover (e.g., the time required for the failover controller to start up and begin processing the I/O operations sent by the initiators). One option is to prepare the network layer as soon as possible, even though the lower layer(s) in the storage server stack have not completed preparation. As described above, in conventional failover operations, preparation of the network layer is dependent upon preparation of the lower layer(s) in the storage stack and the lower layer(s) may require a relatively long period of time to complete preparations (e.g., a timeout period between forty seconds and one minute for the disk subsystem layer alone). Thus, to prepare the network layer of the storage stack as soon as possible, dependencies between layers in the storage server stack can optionally be removed. For example, preparation of the network layer can be performed in parallel with preparation of the lower layers of the storage server stack (e.g., the device manager layer, the disk subsystem layer, etc.). Alternatively or additionally, preparation of the network layer can begin before completing preparation of the lower layers of the storage server stack (e.g., the device manager layer, the disk subsystem layer, etc.).

As described above, in order to prepare the network layer of the storage server stack, there should be an underlying device (e.g., a block device, storage volume, fileshare, etc.) to field the I/O operations from the initiators. In conventional failover operations, data and/or metadata (e.g., volume data, volume metadata, cache data, cache metadata, etc.) must be updated in the failover controller, which requires the lower layers in the storage server stack to start up first when this information is persisted in the disk subsystem. Accordingly, to avoid this problem, information can be timely synched between the redundant storage controllers in the data storage system, such that the failover controller will have updated data and/or metadata in the event that the primary controller fails. Timely synchronization of the data and/or metadata between the redundant storage controllers maintains the fidelity or accuracy of write I/O operation order. In other words, all of the information about the underlying devices will be readily available in the failover controller during the process of failover. For example, U.S. Pat. No. 8,650,328 to Chatterjee et al., entitled "BI-DIRECTIONAL COMMUNICATION BETWEEN REDUNDANT STORAGE CONTROLLERS" describes one example technique for timely synching data and/or metadata between redundant storage controllers.

By timely synching data and/or metadata between the redundant storage controllers, one or more pseudo devices (or virtual devices) can be created using the in-memory information stored in the failover controller. The pseudo device can be a block device, storage volume, or fileshare, for example. The failover controller can then expose the pseudo devices to the initiators. It should be understood that the in-memory information includes the data and/or metadata synchronized between the redundant storage controllers. In this way, the network layer does not have to wait for (i.e., is not dependent upon) completion of preparation of the lower layer(s) in the storage server stack (e.g., the disk subsystem layer, the device manager layer, etc.) before updating the data and/or metadata. Instead, with the pseudo devices created, the network layer of the failover controller can take over the network credentials and impersonates its network identity. Additionally, by creating the pseudo devices, the I/O operations received by the failover controller can be held for a longer duration. For example, instead of failing the received I/O operations, the failover controller can maintain or store the received I/O operations in a queue. These I/O operations can then be processed by the failover controller from the queue after all of the layers in the storage server stack of the failover controller have completed their respective failover operations. The techniques above can speed up failover operations and/or reduce the failover time. For example, while the lower or underlying storage layers (or modules) prepare for operations, the network layer (e.g., including the creation of pseudo devices) can be set up simultaneously such that the failover controller is ready to field I/O operations from the initiators more quickly. These techniques reduce the module dependencies and reduce the failover time a considerable amount.

Figure 4:
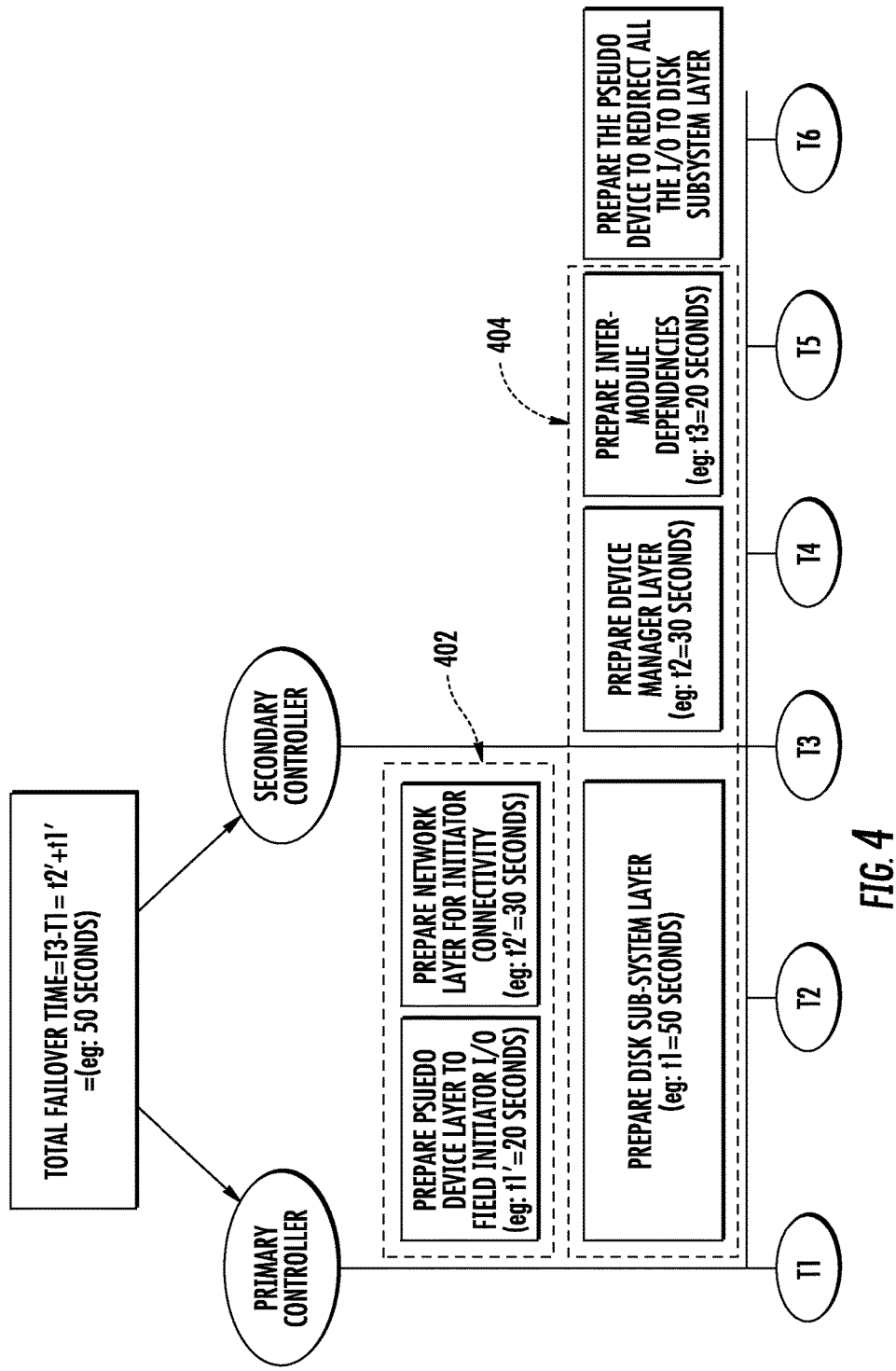
FIG. 4 is a diagram illustrating example failover operations in a storage system with redundant storage controllers.

For example, FIG. 4 is a diagram illustrating failover operations. In FIG. 4, the primary controller fails at time T1. In a first step, the lowest layer of the storage server stack (e.g., the disk subsystem layer) of the secondary controller (i.e., the failover controller) is prepared for I/O operations. In FIG. 4, preparing the disk subsystem layer may take approximately 50 seconds (e.g., t1=50 seconds). This operation is similar to the first step described above with reference to FIG. 3. As shown in FIG. 4 and in parallel with preparing the disk subsystem layer, one or more pseudo devices (or virtual devices) can be prepared, for example using the in-memory information stored in the failover controller, and then the network layer can be prepared for I/O operations. In FIG. 4, preparing the pseudo devices and preparing the network layer (e.g., the operations shown in dotted box 402 in FIG. 4) can be formed sequentially such that preparation of the pseudo devices is completed before preparing the network layer. Additionally, these operations can be performed before completion of preparation of the lower layers of the storage server stack (e.g., the device manager layer, the disk subsystem layer, etc.). This disclosure also contemplates that preparation of the pseudo devices and the network layer can optionally be performed in parallel with preparation of other lower layers of the storage server stack (e.g., the device manager layer) and/or in parallel with preparing inter-module dependencies. In other words, the operations shown in the dotted box 402 can be performed in parallel with the operations shown in the dotted box 404. In FIG. 4, preparing the pseudo devices may take approximately 20 seconds (e.g., t1'=20 seconds), and preparing the network layer may take approximately 30 seconds (e.g., t2'=30 seconds). Additionally, in FIG. 4, the secondary controller (i.e., the failover controller) is ready to take over I/O operations at time T3. Accordingly, the total failover time in FIG. 4 is T3−T1=t1'+t2'=50 seconds. Thereafter, other layers of the storage server stack can be prepared for I/O operations. In FIG. 4, the device manager layer and inter-module dependencies are prepared after the secondary controller is ready to take over I/O operations at time T3. In FIG. 4, preparing the device manager layer may take approximately 30 seconds (e.g., t2=30 seconds), and preparing the inter-module dependencies may take approximately 20 seconds (e.g., t3=20 seconds). Preparing the disk subsystem layer, the device manager layer, and the inter-module dependencies (e.g., the operations shown in dotted box 404 in FIG. 4) can be performed sequentially similarly as described above with regard to FIG. 3. As described herein, while the other layers of the storage server stack are prepared, the failover controller can store I/O operations in a queue, and after completing preparation of all layers of the storage server stack, the I/O operations stored in the queue can be redirected to the storage system. Thus, because the network layer is prepared as soon as possible (e.g., preparation is not dependent on preparation of all lower layers), the failover time can be reduced. It should be understood that the respective times for preparing the various layers in FIG. 4 are provided only as examples and that the respective times may have other values. For example, the estimated times for preparing the various layers described above with regard to FIG. 4 depend on various factors in the storage server stack including, but not limited to, RAID level, a number of RAID devices, the number of modules in the storage server stack which has inter-module dependencies, and the number of network devices. As described above, the overall timeout period for the failover operations can be set to not exceed the I/O operation timeout configured on the application side.

Figure 5:
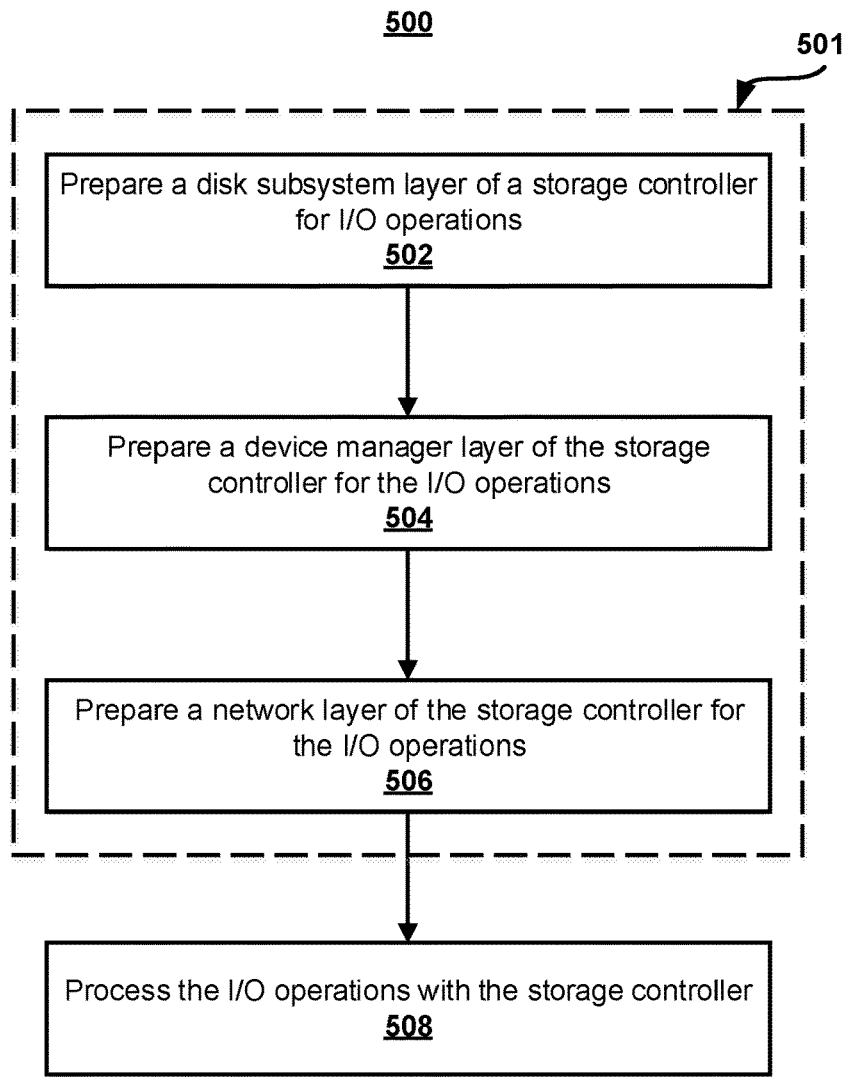
FIG. 5 is a flow diagram illustrating example operations for performing failover operations as described herein.

Referring now to FIG. 5, additional details will be provided regarding the embodiments presented herein for performing failover operations 500 in a data storage system. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

Optionally, the operations 500 can be performed by the storage system (e.g., the storage system 100 of FIG. 1) having redundant controllers (e.g., the storage controllers 102A, 102B of FIG. 2). In response to a failure of a first storage controller or primary controller (e.g., the storage controller 102A of FIG. 2), a second storage controller or secondary controller (e.g., the storage controller 102B of FIG. 2) can perform the operations shown in dotted box 501. In particular, at 502, the secondary controller can prepare a disk subsystem layer (e.g., the disk subsystem layer 206 of FIG. 2) of a storage server stack (e.g., the storage stack 204 of FIG. 2) for I/O operations. At 504, the secondary controller can prepare a device manager layer (e.g., the device manager layer 208 of FIG. 2) of the storage server stack for the I/O operations. At 506, the secondary controller can prepare a network layer (e.g., the network layer 212 of FIG. 2) of the storage server stack for the I/O operations. It should be understood that operations for preparing the disk subsystem, device manager, and/or network layers can include any of the operations described above. Additionally, the disk subsystem, device manager, and network layers can be prepared for the I/O operations without dependencies. In particular, preparation of the network layer is not dependent on preparation of the disk subsystem layer or the device manager layer. At 508, the secondary controller can process the I/O operations from the initiators (e.g., the initiators 112 of FIGS. 1 and 2).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for performing faster failover operations in a dual controller data storage system including a first storage controller and a second storage controller, comprising:
   in response to a failure of the first storage controller, performing failover operations with the second storage controller, wherein the failover operations comprise:
      preparing a disk subsystem layer for input/output ("I/O") operations,
      preparing a device manager layer for the I/O operations, and
      preparing a network layer for the I/O operations;
   creating one or more pseudo devices for fielding the I/O operations before completing preparation of the disk subsystem and device manager layers for the I/O operations, wherein the one or more pseudo devices are created using in-memory device metadata information synchronized between the first and second storage controllers, and wherein preparing the network layer for the I/O operations comprises exposing the one or more pseudo devices to an initiator of the I/O operations;
   receiving an I/O operation directed to the one or more pseudo devices; and
   processing the I/O operations with the second storage controller after the disk subsystem layer, the device manager layer, and the network layer are prepared for the I/O operations, wherein preparing the network layer for the I/O operations is not dependent on preparing the disk subsystem layer or the device manager layer for the I/O operations.

2. The computer-implemented method of claim 1, wherein preparation of the network layer for the I/O operations begins before completing preparation of the disk subsystem layer or the device manager layer for the I/O operations.

3. The computer-implemented method of claim 1, wherein the network layer is prepared for the I/O operations in parallel with preparing the disk subsystem and device manager layers for the I/O operations.

4. The computer-implemented method of claim 1, further comprising synchronizing data between the first and second storage controllers before the failure of the first storage controller, wherein the one or more pseudo devices are created using the synchronized data, and wherein the synchronized data includes the in-memory device metadata information.

5. The computer-implemented method of claim 4, wherein the synchronized data comprises volume data, volume metadata, cache data, or cache metadata.

6. The computer-implemented method of claim 1, further comprising:
   maintaining the received I/O operation in a queue, wherein the received I/O operation is processed from the queue after the disk subsystem layer, the device manager layer, and the network layer are prepared for the I/O operations.

7. The computer-implemented method of claim 1, wherein preparing the device manager layer comprises mounting a block device or file system.

8. The computer-implemented method of claim 1, wherein preparing the disk subsystem layer comprises abstracting organization of a redundant array of inexpensive disks ("RAID").

9. A non-transitory computer-readable recording medium having computer-executable instructions stored thereon for performing faster failover operations in a dual controller data storage system including a first storage controller and a second storage controller that, when executed by the second storage controller, cause the second storage controller to:
   in response to a failure of the first storage controller, perform failover operations comprising:
      preparing a disk subsystem layer for input/output ("I/O") operations,
      preparing a device manager layer for the I/O operations, and
      preparing a network layer for the I/O operations;
   create one or more pseudo devices for fielding the I/O operations before completing preparation of the disk subsystem and device manager layers for the I/O operations, wherein the one or more pseudo devices are created using in-memory device metadata information synchronized between the first and second storage controllers, and wherein preparing the network layer for the I/O operations comprises exposing the one or more pseudo devices to an initiator of the I/O operations;
   receive an I/O operation directed to the one or more pseudo devices; and
   process the I/O operations after the disk subsystem layer, the device manager layer, and the network layer are prepared for the I/O operations, wherein preparing the network layer for the I/O operations is not dependent on preparing the disk subsystem layer or the device manager layer for the I/O operations.

10. The non-transitory computer-readable recording medium of claim 9, wherein:
   preparation of the network layer for the I/O operations begins before completing preparation of the disk subsystem layer or the device manager layer for the I/O operations; or
   the network layer is prepared for the I/O operations in parallel with preparing the disk subsystem and device manager layers for the I/O operations.

11. The non-transitory computer-readable recording medium of claim 9, having further computer-executable instructions stored thereon that, when executed by the second storage controller, cause the second storage controller to synchronize data between the first and second storage controllers before the failure of the first storage controller, wherein the one or more pseudo devices are created using the synchronized data, wherein the synchronized data includes the in-memory device metadata information.

12. The non-transitory computer-readable recording medium of claim 11, wherein the synchronized data comprises volume data, volume metadata, cache data, or cache metadata.

13. The non-transitory computer-readable recording medium of claim 9, having further computer-executable instructions stored thereon that, when executed by the second storage controller, cause the second storage controller to:
   maintain the received I/O operation in a queue, wherein the received I/O operation is processed from the queue after the disk subsystem layer, the device manager layer, and the network layer are prepared for the I/O operations.

14. The non-transitory computer-readable recording medium of claim 9, wherein preparing the device manager layer comprises mounting a block device or file system, and wherein preparing the disk subsystem layer comprises abstracting organization of a redundant array of inexpensive disks ("RAID").

15. A system for performing faster failover operations in a dual controller data storage system, comprising:
   a first storage controller; and
   a second storage controller, wherein, in response to a failure of the first storage controller, the second storage controller is configured to perform failover operations comprising:
      preparing a disk subsystem layer for input/output ("I/O") operations,
      preparing a device manager layer for the I/O operations, and
      preparing a network layer for the I/O operations, wherein the second storage controller is further configured to:
   create one or more pseudo devices for fielding the I/O operations before completing preparation of the disk subsystem and device manager layers for the I/O operations, wherein the one or more pseudo devices are created using in-memory device metadata information synchronized between the first and second storage controllers, and wherein preparing the network layer for the I/O operations comprises exposing the one or more pseudo devices to an initiator of the I/O operations;
   receive an L/O operation directed to the one or more pseudo devices; and
   process the I/O operations after the disk subsystem layer, the device manager layer, and the network layer are prepared for the I/O operations, wherein preparing the network layer for the I/O operations is not dependent on preparing the disk subsystem layer or the device manager layer for the I/O operations.

16. The system of claim 15, wherein:
   preparation of the network layer for the I/O operations begins before completing preparation of the disk subsystem layer or the device manager layer for the I/O operations; or
   the network layer is prepared for the I/O operations in parallel with preparing the disk subsystem and device manager layers for the I/O operations.

17. The system of claim 15, wherein the second storage controller is further configured to synchronize data between the first and second storage controllers before the failure of the first storage controller, wherein the one or more pseudo devices are created using the synchronized data, wherein synchronized data includes the in-memory device metadata information.

* * * * *